United States Patent [19]

Vennekens

[11] Patent Number: 5,652,711
[45] Date of Patent: Jul. 29, 1997

[54] PARALLEL PROCESSING OF PAGE DESCRIPTION LANGUAGE DATA STREAM

[75] Inventor: Pierre Vennekens, Hever, Belgium

[73] Assignee: Agfa Gevaert, N.V., Mortsel, Belgium

[21] Appl. No.: 618,538

[22] Filed: Mar. 19, 1996

[30] Foreign Application Priority Data

May 23, 1995 [EP] European Pat. Off. ............. 95200724

[51] Int. Cl.$^6$ .................................................. G06T 9/00
[52] U.S. Cl. ............................... 364/514 A; 395/116
[58] Field of Search ................... 364/514 A; 395/116, 395/144, 114, 100; 382/9, 11, 58

[56] References Cited

U.S. PATENT DOCUMENTS 5,359,673 10/1994 de la Beaujardier ............. 382/40
5,402,527 3/1995 Bigby et al. ..................... 395/101
5,504,843 4/1996 Catapano et al. ................. 395/115

*Primary Examiner*—Emanuel T. Voeltz
*Assistant Examiner*—Thomas Peeso
*Attorney, Agent, or Firm*—Julie A. Krolikowski; John A. Merecki

[57] ABSTRACT

The image to be printed on a hard copy such as paper, micro film and photographic film, can be specified in a page description language. A raster image processor, for converting the page description language data stream in a bitmap representation, usually first translates the original data stream in an intermediate data stream. By properly segmentation of the original data stream and inclusion of control commands, this translation process can be handled by several processors parallelly. This improves the throughput of the translation process by a factor which is almost a linear function of the number of processing systems used parallelly.

14 Claims, 1 Drawing Sheet

PARALLEL PROCESSING OF PAGE DESCRIPTION LANGUAGE DATA STREAM

FIELD OF THE INVENTION

The present invention relates to devices and methods for converting a data stream in page description language—describing one or more images or pages—into a bitmap representation of said image for output on film, paper, video monitor, printing plate etc. The invention can be applied in the graphical industry, micrography, desktop publishing etc. More specifically the invention is related to a multi-processing device converting the data stream to an intermediate or bitmap format.

BACKGROUND OF THE INVENTION

Electronic reproduction by output devices on hardcopy material requires fast transformation of layouts—usually defined in some page description language (PDL)—to a bitmap representation of the images described by the layouts. Examples of PDL's are PostScript (a trade mark of Adobe Inc.), AgfaScript (a trade mark of Agfa-Gevaert A. G. in Leverkusen, Germany), IPDS (Intelligent Printer Data Stream part of the Common Communications Support, defined by IBM within the Systems Application Architecture context). A bitmap representation is a one to one relation between pixels written by an output device on a hard copy and the electronic signals for varying the density of these pixels. A device pixel is the smallest spatial entity on the hardcopy material of which the density can be changed by the output device. If the density of the device pixel can take two different values, e.g. black and white, the output device is a hi-level device and in the bitmap representation one bit, representing a zero or one, is necessary for each device pixel. If the output device can render up to sixteen density levels per device pixel, at least four bits per device pixel are required in the bitmap. Output devices rendering 256 density levels, require eight bits per device pixel. Colour output devices usually require one bitmap per colour component, e.g. cyan, magenta, yellow and black. The size of the bitmap or bitmaps is thus a function of the number of density levels represented by the output device and the number of colour components. The size is dependent also on the spatial resolution of the device pixels. The spatial resolution is expressed in device dots per inch or pixels per millimeter. The higher the resolution, the larger the bitmap will be. Also the total size of the hard copy is decisive for the number of memory elements required in the bitmap. For a hi-level A4 printer—the hardcopy measures 297 mm by 210 mm—having a resolution of 400 dots per inch or about 16 pixels per mm, a bitmap requires nearly 15 megabit (15 times $2^{20}$ bits). With the increasing demand for high quality reproductions, the spatial resolution has increased to 600 dots per inch, the number of colour components to four, the number of density levels per colour component to sixteen, and the size to A3 (420 mm by 297 mm). This raises the required amount of memory to about 1062 megabit. This large amount of memory poses not only problems for the storage capacity, but also for the generation of this large amount of data in the bitmap, representing the image on the hard copy. The output device converts the bitmap representation to a visible image on hard copy or on a display monitor.

The transformation of a PDL data stream to a bitmap representation is done in a Raster Image Processor (RIP). This device receives a PDL data stream, interprets its contents and produces a bitmap representation suitable for the output device, i.e. the spatial resolution, number of density levels, number of colour components and size of the bitmap corresponds to the characteristics of the output device.

Although the resolution increased dramatically, and as a result the amount of data transfer increased between the RIP and the display or rendering device, and also towards the RIP itself, the RIP became the bottle neck in translating the PDL data stream in a bitmap. This evolution is due to the higher throughput of the current transmission means. The throughput of a translation process in a RIP can be defined in terms of the amount of data in the PDL data stream per unit of time that can be processed by the RIP system. Several measures to increase the throughput of the translation process have been taken in the past:

1) The throughput of the hardware processor, on which the translation process runs, can be increased by use of a faster processor or dedicated hardware;
2) Programming techniques or languages can be applied to enhance the overall system performance;
3) The conversion process can be split sequentially in sub-processes, that are executed on different processors.

The disadvantage of using dedicated hardware. e.g. for generating a bitmap, is its poor cost-effectiveness. Whenever changes in functional, performance or marketing requirements occur, a high investment in hardware upgrade may be necessary. A system based on standard hardware components and configurable software modules allows more flexibility to react quickly on changing requirements. There is thus a serious need to increase the throughput of a raster image processor, using cost-effective of-the-shelf hardware components and configurable software techniques. WO-A 94 11805 and EP-A 0 574 224 describe analoguous sytems, applying different techniques.

OBJECTS OF THE INVENTION

It is therefore a first object of the invention to provide a method to increase the performance of a Raster Image Processor.

It is a further object of the invention to provide a method, wherein several processors can operate simultaneously.

It is even a further object of the invention to provide a method such that the performance is almost a linear function of the number of processors working in parallel.

It is a specific object of the invention that despite parallel processing, the correct sequence of pages—sent to the display or rendering device or the underlying system—is maintained.

Further objects and advantages of the invention will become apparent from the description hereinafter.

SUMMARY OF THE INVENTION

In accordance with the present invention, a method is disclosed for reproducing an image described by a PDL data stream, comprising the following steps:

- recognising in said PDL data stream data commands and control commands;
- generating a plurality of independent PDL data stream segments;
- assigning each data command to one of said segments;
- assigning at least one control command to more than one of said segments;
- translating each of said segments to intermediate data stream portions;

combining said portions to one intermediate data stream; and, reproducing said image from said intermediate data stream.

Usually, the PDL data stream is converted to an intermediate data stream, suitable for conversion to a bitmap representation for the reproduction of the image described by the PDL data stream.

The creation of independent PDL data stream segments has the advantage that the segments can be processed concurrently and the processing load can be distributed over different sub-processes, running on several processors parallelly. In a preferred embodiment, a translation state is built from control commands and kept by the sub-processes, translating the segments in intermediate data stream portions. This has the advantage that no communication between sub-processes is required. In another embodiment, the translation state may be built up in a central process. Each sub-process must get from that central process the correct translation state. In a more preferred embodiment, the communication of control commands is reduced. Further, the processing of extended control commands—as defined below—is preferentially executed by one sub-process, maybe different for each command. One central master process would be a bottle neck if it had to process all such commands. Moreover, by distributing extended control commands over different sub-processes, also these commands can be processed in parallel or simultaneously.

A PDL data stream is, as discussed above, a sequence of electronic signals, describing in some higher level Page Description Language how an image must look on a hard copy or on a video display unit. The image may consist of just text, like printed pages. The image may also contain graphics, pictures, continuous tone images etc. Examples of PDL are PostScript, AgfaScript, IPDS. An intermediate data stream is a sequence of electrical signals, describing the same image but at a lower level. A typical example is a Display List, describing an image as a combination of trapezoids. The conversion of the intermediate data stream format to a bitmap representation can then be performed in an efficient way. According to the method of the current invention, the intermediate data stream may also be a bitmap representation of the image to be rendered on the output medium. As such, no extra conversion step from the intermediate data stream format to a bitmap representation is required. The difference between data commands and control commands is further discussed in the detailed description below.

An independent PDL data stream segment is a portion of the full PDL data stream. All data commands from the PDL data stream can be found in the same sequence in the segments. All data commands corresponding to one page or region are always grouped in just one segment. A region is a disjunctive portion of a physical medium. A segment will thus describe the complete image to be rendered on at least one such region. Thus, according to the method of our invention, each data command from the PDL data stream is assigned to just one segment. Unlike control commands, which may be duplicated over different segments, each specific data command is not duplicated or distributed over several segments, and will be found in just one segment. Usually, a segment contains several data commands, making up the description of one region. Moreover, a segment may contain data commands corresponding to more than one region.

Unlike data commands, extra control commands may be added to make each segment independent. According to the method of this invention, at least one control command will be duplicated once or more and sent in two or more different segments. It is also possible that some superfluous control commands are removed from the generated segments to increase the performance. Such a segment describes one or more regions or pages. As stated before, a region is a disjunctive portion of a physical medium. In the most simple case, each segment describes an image to be printed on an individual page. In micrography, different "pages" are arranged on one single physical microfiche. In that case, the complete image on one fiche can be described by a plurality of independent PDL data stream segments. It is also possible that a physical page is composed of two rectangular text blocks, and an area around these blocks. Each individual text block can be described by an independent PDL data stream segment composed of a text image, and the area around these blocks can constitute another image, described by an independent PDL data stream segment, comprising graphics, references, position markers etc. In another embodiment, a physical page can be divided in successive adjacent but disjunctive bands. Data commands and control commands affecting the image of each individual band, can be arranged in an independent PDL data stream segment.

The transformation of the PDL data stream to independent PDL data stream segments is preferably done by one master process. The conversion of individual independent PDL data stream segments into intermediate data stream portions is preferably done by one or more sub-processes. The master process and several sub-processes can run simultaneously on one or several processing systems. The number of processes can be greater or equal to the number of processors. As such, the translation of independent PDL data stream segments can run parallelly on different processors. By the choice of the amount of sub-processes, the amount of processor systems and the distribution of the sub-processes over the processor systems, the degree of parallelisation can be tuned. When using the method according to this invention the throughput is almost a linear function of the number of processor systems.

DETAILED DESCRIPTION OF THE INVENTION

Figure 1:
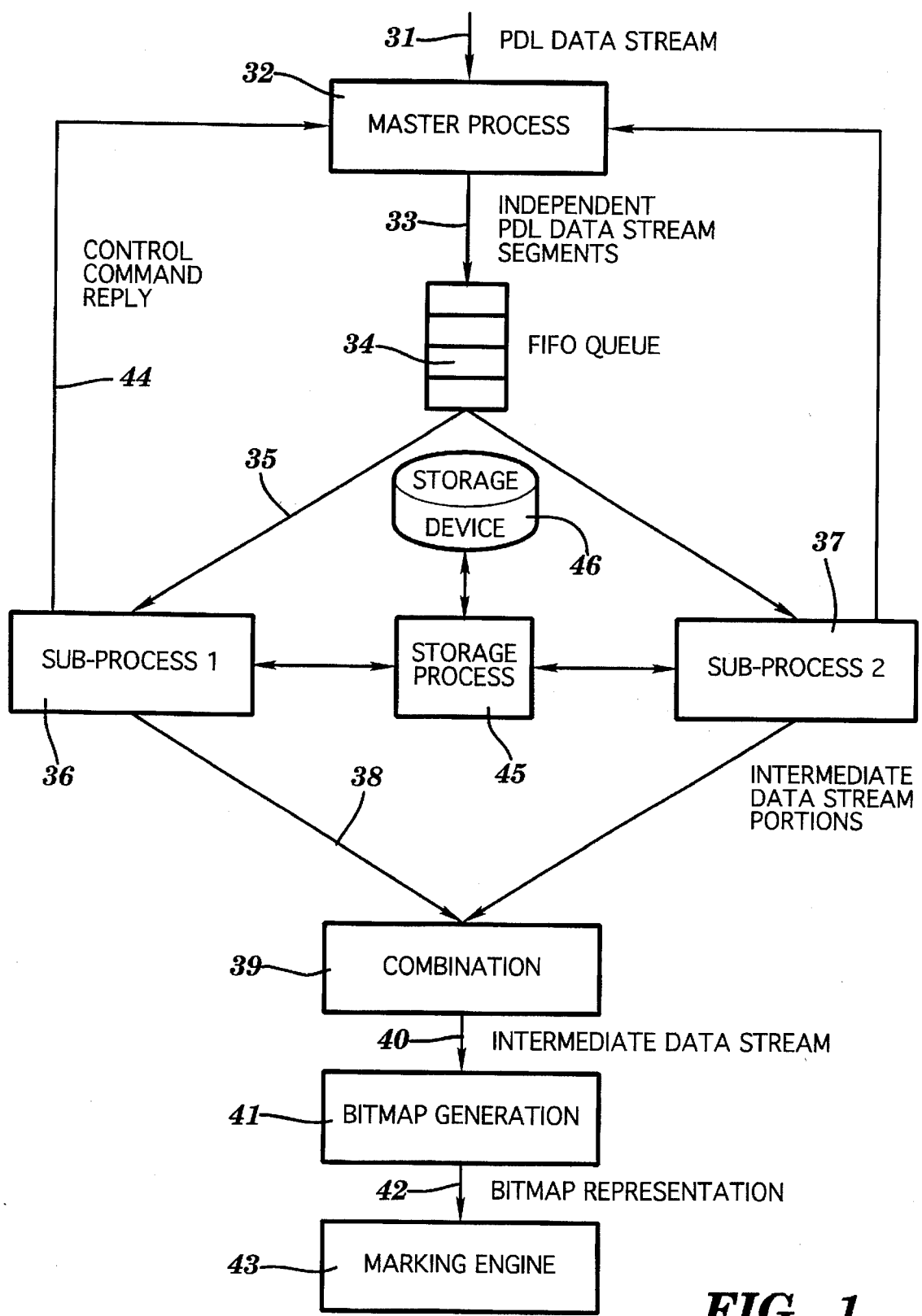

The invention is described hereinafter by way of examples with reference to the accompanying figure wherein:

FIG. 1 shows a specific embodiment for carrying out the method according to the current invention.

Referring to FIG. 1, a PDL data stream 31 mainly comprises commands and optionally e.g. comments. The comments usually need no further processing. The commands can be subdivided in data commands and control commands. The control commands can be further subdivided in extended control commands and reduced control commands. The distinction between extended and reduced control commands can be made upon their semantics, but also on their size.

Data commands describe which data must be reproduced, such as text, graphics and images. The contents of a data command can fully describe the data to be reproduced, but usually the data command comprises an implicit or explicit reference to extended data structures. These are defined by extended control commands or they are permanently present in the raster image processor system. Typical extended data structures are resident or downloaded font descriptions, page sections, forms and overlays.

Whereas data commands describe which data must be reproduced, control commands define how data must be reproduced. For processing a data command, the sub-processes 36, 37 that convert PDL data stream segments into intermediate data stream portions, must take care of a translation state that applies to that data command. The translation state is built up from the preceding control commands. In some PDL's local control commands are effective only once and are substituted by a default local control command if the required local command is not present. Local control commands will not contribute to the translation state. Such PDL's define global control commands as effective until their effect is overruled by another global control command. Their effect remains valid over subsequent regions or pages and as such, global control commands contribute to the translation state.

Most PDL data streams do not describe subsequent regions in a region or page independent way. However, a clear separation of data commands belonging to one region must be possible. In the IPDS language for example, the start of data commands related to a page is indicated by the "BeginPage" command. The last data command related to a page is indicated by the "EndPage" command. The sub-processes 36, 37 that translate the data commands into intermediate data stream portions must have full knowledge of the translation state, which is decisive for the correct interpretation of the data commands from the PDL data stream into the intermediate data stream. The translation state is built up by all previous control commands, even those defining the translation state of previous regions or pages. Each sub-process has either to keep track of the translation state over different independent PDL data stream segments, or has to get full knowledge about the translation state for the current independent PDL data stream segment by the contents of each independent PDL data stream segment. The first alternative is cumbersome to be realised because, due to the plurality of sub-processes, each sub-process only translates a part of the complete set of independent PDL data stream segments.

Extended control commands can define and delete extended data structures as described above. Although the deletion of an extended data structure can be instructed by a short command, such a delete command is preferentially also treated as an extended control command. These extended data structures are preferentially stored temporarily or permanently on a storage device 46, such as a hard disk, any other magnetic carrier or an electronic storage medium such as RAM, ROM, PROM, EPROM, EEPROM etc. Preferentially, the management of extended data structures is assigned to a central storage process 45. Alternatively, this job can be done by the master process 32. Extended data structures can be transmitted to and retrieved from this central storage process 45, which converts the structures to a data format suitable for the storage medium. Several sub-processes can transmit and retrieve extended data structures simultaneously.

Referring to FIG. 1, the master process 32 receives the PDL data stream 31, usually from an external device (not shown) on which an operator specified interactively the images to be reproduced on the hard copy. The PDL data stream 31 can also be generated by a printer spooler program, generating e.g. account information to be printed on micro film. Usually, the master process 32 can also communicate errors, exceptions or status information on demand back to the external device.

In a preferred embodiment, the master process 32 generates error free independent PDL data stream segments, i.e. the sub-processes 36, 37 will not encounter exceptions, for which communication with the master process 32 is necessary. This also means that errors, shortcomings or default values occurring in the PDL data stream are preferably handled by the master process 32.

In a more preferred embodiment, the master process 32 will perform a restricted syntax checking, to establish whether the incoming commands can be interpreted. This may include checking the length of the commands, checking headers, etc. In that case, each sub-process must perform semantic checks, establishing whether the data commands can be really converted to image portions to be rendered on the physical output medium. Typically this includes checking whether referenced fonts or font parameters have been defined etc. The distribution of these semantic checks towards the sub-processes 36, 37 has the advantage that the load on the master process 32 is levied. Error replies from the sub-process 36, 37 to the master process 32, are preferentially sent via the same way as control command replies 44, as discussed below.

The master process 32 will analyze the PDL data stream 31 and especially the control commands. The main task of the master process 32 is to generate independent PDL data stream segments 33, such that each segment can be processed independently from each other segment. This independency guarantees that parallel processing—even even by different processing systems—is viable. This can be done by incorporating in each segment a complete translation state description that applies to the data commands within the segment. Since each independent PDL data stream segment contains sufficient data commands to describe which images must be reproduced on the region or page and contains a complete set of control commands to instruct how the data commands must be interpreted, the independent PDL data stream segments can be processed independently from each other. Preferentially, each independent PDL data stream segment or a reference to this segment—often realised by a memory address pointer—is put in a first in, first out (FIFO) queue 34 by the master process 32. The FIFO organisation makes sure that the independent PDL data stream segments are selected by the sub-processes 36, 37 in the same order as these independent PDL data stream segments are generated by the master process 32. One or more sub-processes 36, 37 can then access the FIFO queue and allocate an independent PDL data stream segment 35 for processing. Because each independent PDL data stream segment is self-contained, it does not matter which sub-process takes which independent PDL data stream segment. Whenever a sub-process is finished with an independent PDL data stream segment, it can take another independent PDL data stream segment from the FIFO queue. A specific independent PDL data stream segment is thus not assigned to a specific sub-process, but rather each sub-process selects the next independent PDL data stream segment available for processing from the FIFO queue. As such the load of the sub-processes 36, 37 is balanced automatically and the translation work, which can be very different for different independent PDL data stream segments, is evenly distributed over the sub-processes 36, 37. Since each independent PDL data stream segment is self-contained, no extra communication is necessary mutually between the sub-processes 36, 37 nor between the master process 32 and each sub-process. This is very advantageous when the different sub-processes 36, 37 are distributed over different processors. The processors can communicate data, e.g. independent PDL data stream segments, with each other:

via a common bus structure, e.g. a VME-bus;
via point to point links, e.g. serial RS232-C, parallel centronics, etc.;

via network connections e.g. ethernet, ethertalk, etc.

Only the complete independent PDL data stream segment must be transmitted via this link. Preferentially, each processor has an independent memory, required to keep the data within an independent PDL data stream segment, the intermediate data stream portion 38 generated from the independent PDL data stream segment 35 and some local data structures required for the translation of the independent PDL data stream segment into the intermediate data stream.

Master process 32 and sub-processes 36, 37 can be freely distributed over the available processor systems. If two processor systems A and B are available, the master process 32 could run on the processor system A and a sub-process could run on processor system B. If a second sub-process would be installed, this could run on processor system A, concurrently with the master process 32. If a third sub-process would be installed, this could run on processor system B, concurrently with the first sub-process. In a preferred embodiment, the number of processor systems is not smaller than the number of sub-processes. If two processes run on one processor system, they preferentially each take a partition of the independent memory. Transmission of an independent PDL data stream segment from the master process 32 to a sub-process on the same processor system can be done by a memory copy of the independent PDL data stream segment from the master process partition to the sub-process partition. Alternatively, the memory blocks containing the independent PDL data stream segment can be released from the master process partition and assigned—preferentially by the sub-process—to the sub-process partition. Such blocks may be assigned back again to the master process partition as soon as the sub-process is ready with the processing of the independent PDL data stream segment. Even if the master process 32 and the sub-process do not run on the same processor system, it is possible to give the sub-process a pointer to the memory location where the independent PDL data stream segment resides. The sub-process 36 or 37 may then access the data within the independent PDL data stream segment via the bus, link or network connecting the two processor systems.

In the first embodiment described above, the master process 32 builds a translation state from control commands present in the PDL data stream. Each sub-process gets a complete translation state description by control commands in a header of each independent PDL data stream segment. The transmission of control commands fully describing the present translation state may impose a serious burden:

on the master process 32 generating the control commands;

on the transmission system, for communicating the control commands from the master process 32 to the sub-process; and on the sub-process for analysing the control commands and building a current state appropriate for the processing of the data commands within the present segment.

An alternative could be to keep the translation state centrally.

In a preferred embodiment, each sub-process builds locally a sub-process translation state and—after processing an independent PDL data stream segment within the sub-process translation state context—keeps the state information as a starting point for use during processing of the next independent PDL data stream segment. Preferentially, the header of the independent PDL data stream segment contains control commands to set the sub-process translation state appropriate for processing the data commands within the independent PDL data stream segment correctly. As such, the master process 32 has only to communicate changes between a current master translation state and the sub-process translation state. Until now however, there is no mechanism that allows the master process 32 to know the sub-process translation state, which is required to communicate the changes. Moreover, each sub-process can have a different sub-process translation state and the master process 32 does not decide by which sub-process a specific independent PDL data stream segment will be processed.

Therefore, in a preferred embodiment, each sub-process that changes its sub-process translation state according to control commands, replies this change to the master process 32 by means of a control command reply 44. The master process 32 gathers these replies per sub-process and keeps track of a common translation state level. The common translation state level is defined as the translation state built from those control commands that have been processed and replied by all sub-processes. According to this definition, each sub-process reached a sub-process translation state which is at least as recent as the common translation state level. Therefore, the master process 32 can safely base state changes on the difference between the current master translation state and the common translation state level. These state changes indicate which control commands must be transmitted in the next independent PDL data stream segment to be generated. If more than one sub-process interprets the independent PDL data stream segments, it is very likely that at least one sub-process reached a sub-process translation state which is more recent than the common translation state level. If such a sub-process gets a next independent PDL data stream segment for processing, this independent PDL data stream segment will contain control commands that have been processed already by the sub-process. The sub-process preferentially just discards these superfluous control commands, performs no state change and issues no reply to the master process 32, because the state change and reply have been generated earlier. As such, it is clear that each sub-process will reply only once to each non-superfluous control command. Whether a control command is superfluous or not depends on the translation state of the sub-process. In that case the master process 32 can keep track of the number of times a specific control command has been replied. If that number for a specific control command reaches the number of sub-processes in the system, that specific control command updates the common translation state level. That way, the master process 32 must not keep track of the sub-process translation state replied by each sub-process individually. This process, based on the reply of control commands, reduces seriously the amount of control commands issued by the master process 32 in the independent PDL data stream segments and is therefore called control command reduction.

A further control command reduction is preferably achieved by the following process. The master process 32 analyzes the value, rather than just the presence, of each control command within the PDL data stream. If it is clear from the contents of the control command that it does not alter the master translation state, the control command is not included in any independent PDL data stream segment. This way, the master process 32 reduces the amount of control commands, without harming the independency of the PDL data stream segments. This further control command reduction imposes an extra processing step on the master process 32. Depending on the load of this extra control command processing by the master process 32 as opposed to the load of transmitting the superfluous control commands via the segments to the sub-processes 36, 37, it must be decided to implement this optimisation or not. If the master process 32 is not a bottle neck, the master translation state may be built up from fully analysing each control command, and this optimisation improves the total throughput of the system.

To the extent that independent PDL data stream segments must be fully independent, it is required that extended control commands are also included in all subsequent independent PDL data stream segments. The inclusion of extended control commands in these subsequent independent PDL data stream segments has three important drawbacks:

1) The size of such an extended control command can be prohibitively large to be included in more than one independent PDL data stream segment.
2) Processing extended control commands requires a serious amount of processing time. The same burden should not be put on all sub-processes.
3) The size of the extended data structures generated from such an extended control command can be prohibitively large to be stored by each sub-process separately.

In a preferred embodiment, the first and the second problem can be solved by not incorporating an extended control command in an independent PDL data stream segment but by having it processed by the master process 32 or a central process. The third problem is solved by central storage of the extended data structure generated from the extended control command. The disadvantages of this solution are that:

1) it would impose an extra load on the master process 32;
2) several extended control commands could not be processed simultaneously.

In a more preferred embodiment, the first and the second problem are solved by incorporating each individual extended control command in one independent PDL data stream segment only. By this option, only that sub-process—by which it will be processed—will be aware of the extended control command. If several sub-processes are running in parallel, it is possible that several extended control commands—such as the definition or creation of fonts—are processed simultaneously. The third problem is solved by sending the extended data structure to a central storage process 45 for storage on a storage device 46. Preferentially one extended control command is stored in one independent PDL data stream segment (i.e. a "dummy" segment), which further does not contain any other extended control commands or data commands. The processing of this type of segment will result in an empty intermediate data stream portion, plus in the creation of an extended data structure that is sent to the central storage process 45 for storage on the storage device 46.

To make other sub-processes aware of the existence of the extended control command, preferentially a specific control command—called "version" control command—is inserted in all subsequent independent PDL data stream segments. A version control command has the same syntax as usual control commands, but is introduced by the master process 32 only, and inserted in independent PDL data stream segments. The version control command has also the function to make the extended data structures—generated from the extended control command—accessible to all sub-processes. Each sub-process preferably maintains a local table identifying valid extended data structures. This identification is used to access the extended data structures via the central storage process 45. Each version control command contains such an identification.

A version control command is introduced for the creation and for the removal of an extended data structure. On creation, an entry in the local table of the sub-process is added, identifying the created extended data structure. On removal, the appropriate entry in the table is removed. It is of utmost importance that the sequence of these operations is maintained properly. The master process 32 must keep the right sequence, such that each sub-process receives the version control commands in the required order. Moreover, the same sub-process must not fully process the same version control command twice or more, updating its internal tables.

According to the above discussion of control command reduction, a "version" control command is included in the header of each independent PDL data stream segment, preferably until all sub-processes 36, 37 replied the master process 32 the processing of the "version" control command.

Alternatively, the master process 32 keeps a table with identifications of the valid extended data structures and transmits this table to each sub-process via a header in each independent PDL data stream segment. Via a reply mechanism as described above, the size of the table transmitted via the independent PDL data stream segments can be reduced whenever a certain common table level for all sub-processes is reached. The master process 32 must update the table in the same sequence as it has been built.

To retrieve extended data structures relating to an extended control command, each sub-process will have to access the central storage process 45.

A control command in the input data stream can also be intended to remove or over-write an extended data structure. This can happen e.g. if a specific font is not in use any more, or an overlay must be replaced by another overlay etc.

Since an extended data structure may be referenced to by data commands in a next independent PDL data stream segment S2 following a first independent PDL data stream segment S1 containing the extended control command, and S2 may be processed by another sub-process P2 than a first sub-process P1 processing S1, a mechanism must provide for synchronisation such that the other sub-process P2 does not refer to the extended data structure, before it has been created by the first sub-process P1. On the other hand, a control command in the PDL data stream, intended to remove or to over-write an extended data structure, must not be processed by any sub-process before other sub-processes have fully completed processing of previous independent PDL data stream segments. Furthermore, independent PDL data stream segments following the removal by a control command, must not be processed before the removal is effective.

In one embodiment—in order to provide for the required synchronisation—a "segment" control command is introduced, which has the same syntax as usual control commands, but which is introduced by the master process 32 only, and inserted in independent PDL data stream segments. In each independent PDL data stream segment, only one segment control command is incorporated. Each segment control command gets a system-wide unique identification, called segment-id. The master process 32 signals the identification of the extended data structures, which are referenced by data commands, to the central storage process 45 together with the segment-id of the independent PDL data stream segment in which these data commands are incorporated. The master process 32 must therefore analyze the data commands as part of this independent PDL data stream segment. Furthermore, the master process 32 signals the removal or the over-writing of an extended data structure to the central storage process 45 together with the segment-id of the independent PDL data stream segment in which the extended control command is incorporated. The master process 32 signals the creation of an extended data structure to the central storage process 45 together with the segment-id of the independent PDL data stream segment in which the extended control command is incorporated. Whenever a reference is made to an extended data structure, by a sub-process, either for removing purposes or for creation purposes or for usage purposes by a data command, the segment-id of the independent PDL data stream segment in which this extended control command or data command is incorporated must be signalled to the central storage process 45. As such, the central storage process 45 can keep track of the usage of the extended data structures in the different independent PDL data stream segments. The central storage process 45 suspends the removal or over-writing of an extended data structure whenever it is still to be referenced in previous independent PDL data stream segments and until that extended data structure will not be referenced any more by data commands in previous independent PDL data stream segments. The central storage process 45 suspends the creation of an extended data structure whenever a previous removal is not yet effective. The central storage process 45 suspends the usage of extended data structures in subsequent independent PDL data stream segments until the extended data structures are created. The disadvantage of this solution is that the master process 32 must analyze the data commands. As such, this can put a heavy burden on the processing load of the master process 32.

In a more preferred embodiment, a "sync" control command is introduced, which has the same syntax as usual control commands, but which is introduced by the master process 32 only, and inserted in independent PDL data stream segments. Each sync control command gets a system-wide unique identification, called sync-id. Each sub-process, by processing a sync control command in an independent PDL data stream segment, will reply the receipt of the sync to the master process 32, notifying also the sync-id. A sync control reply may follow the same way as a control command reply 44.

A sync control command can be incorporated anywhere in an independent PDL data stream segment. For example, a sync control command may be incorporated in the header of an independent PDL data stream segment or in the trailer of an independent PDL data stream segment.

In a preferred embodiment, each independent PDL data stream segment may comprise one or more sub-segments. All sub-segments belonging to one segment will be processed by the same sub-process. Although each segment or a reference to it is entered as a whole in the FIFO queue 34, consecutive sub-segments may be released for processing individually by the master process 32. This option allows that several sub-segments of a huge independent PDL data stream segment are created, stored in buffers and released for processing by the master process 32, even until buffer space gets exhausted. Although the master process 32 did not process all sub-segments belonging to the huge independent PDL data stream segment, the sub-process which selected the huge independent PDL data stream segment, processes the released sub-segments and releases the buffers of processed sub-segments. These released buffers may then be used by the master process 32 for subsequent sub-segments of the huge independent PDL data stream segment.

A sub-process that receives a sync control command via an independent PDL data stream segment to be processed, must notify the master process 32 as soon as that sync control command is processed by that sub-process. As soon as an independent PDL data stream segment—comprising such a sync control command as part of a sub-segment—is put in the FIFO queue 34, the subsequent sub-segments and the next independent PDL data stream segments may be further generated by the master process 32. However, in a preferred embodiment, their release for processing given by the master process 32, is delayed until a reply from the sync control command is received by the master process 32. As soon as the reply is received, the master process 32 releases for processing by the sub-processes the subsequent sub-segments and the independent PDL data stream segments prepared for processing, except for sub-segments or independent PDL data stream segments following another sync control command. Such sub-segments may be enabled when for that other sync control command a reply is received.

Alternatively, the master process 32 stops the generation of new independent PDL data stream segments and sub-segments until the sync control reply has been received.

A sync control command will be incorporated at the end of an independent PDL data stream segment containing an extended control command. A sub-process that replies the receipt of such a sync control command to the master process 32 acknowledges:

a) that the extended control command is processed resulting in an extended data structure; and b) that the extended data structure is available to all sub-processes via the central storage process 45.

Extended control commands for removal or over-writing extended data structures must also not be processed by any sub-process before previous independent PDL data stream segments have been fully processed by other sub-processes, or at least those independent PDL data stream segments, that make use of the extended data structure. As such, a sync control command is preferably incorporated as a header sub-segment in an independent PDL data stream segment containing such an extended control command. The master process 32 releases for processing by a sub-process the sub-segment comprising the sync control command and will not release any further sub-segments nor independent PDL data stream segments. In a preferred embodiment, these further sub-segments and independent PDL data stream segments are generated by the master process 32, but not released for processing. A sub-process—processing the sub-segment comprising the sync control command—replies the receipt of such a sync control command to a buffer handling process or directly to the master process 32. A sequencing mechanism makes sure that the master process 32 acts on the sync control reply after all previous independent PDL data stream segments and sub-segments of that independent PDL data stream segment—or at least those that use the extended data structures—have been processed. At that time, the master process 32 releases the subsequent sub-segments for processing, such that the extended control command for removing or over-writing extended data structures may be processed by the sub-process that handled the sync control command. It is thus clear that the sync control reply may be finally processed by the master process 32 only when all previous independent PDL data stream segments have been processed by the sub-processes 36, 37. This concept requirement is further described below.

An independent PDL data stream segment containing an extended control command for the removal or over-writing of an extended data structure gets also a sync control command in a trailer sub-segment of the independent PDL data stream segment. This way, the processing of the subsequent sub-segments and the next independent PDL data stream segments will be delayed until the removal has really been effectuated.

As described above, each sub-process generates four types or categories of reply data:
1. control command replies;
2. version control replies;
3. error replies; and
4. sync control replies.

The concatenation of all replies of one category results in a reply data stream per reply data type. For each independent PDL data stream segment, a portion of each reply data stream is generated, further on called a reply data portion. Due to the nature of the reply data, it is possible that some reply data portions are empty. Due to the parallelism of the sub-processes 36, 37, it is possible that reply data portions for the corresponding reply data stream are not ready in the same chronological order as the corresponding independent PDL data stream segments were generated by the master process 32. For error replies, it is a system requirement that the error reply portions are combined to one error reply data stream as imposed by the order of the PDL data stream 31. For the sync control replies, it is a concept requirement that the sync control reply portions are combined to one sync control reply data stream as imposed by the order of the generated independent PDL data stream segments. It is preferable that the four reply data portions—control command reply, version control reply, sync control reply and error reply—are combined to one reply data portion by the sub-process for each independent PDL data stream segment processed. The master process 32, accepting these portions from the sub-processes 36, 37, rearranges these portions in the right sequence.

Also as described above, each sub-process generates an intermediate data stream portion 38, which can be translated more efficiently to a bitmap representation. For each independent PDL data stream segment containing data commands, a portion of the intermediate data stream is generated. Due to the nature of the independent PDL data stream segment (e.g. a "dummy" segment), it is possible that some intermediate data stream portions are empty. Due to the parallelism of the sub-processes 36, 37, it is possible that intermediate data stream portions are not ready in the same chronological order as the corresponding independent PDL data stream segments were generated by the master process 32. It is a system requirement that these portions are combined to one intermediate data stream 40 in the order as imposed by the order of the PDL data stream. A combination process 39, accepting the intermediate data stream portions from the sub-processes 36 or 37, rearranges these portions in the right sequence.

In a first embodiment, the combination process 39 makes use of sequence information, originally generated by the master process 32. In a first embodiment, each time the master process 32 generates a new independent PDL data stream segment, it may assign a unique incrementing sequence number to the independent PDL data stream segment. The sub-process processing that independent PDL data stream segment, passes the sequence number on to the intermediate data stream portion. The combination process 39, upon receipt of the intermediate data stream portion, extracts the sequence number and uses this to rearrange the incoming intermediate data stream portions in the right order. The sequence numbers may also serve for rearranging control command replies, version control replies, sync control replies and error replies. The sub-process, processing an independent PDL data stream segment, may incorporate the sequence number in the reply data portion. The master process 32, upon receipt of the reply data portion, extracts the sequence number and uses this to rearrange the incoming reply data portions in the right order.

In a second embodiment, a separate buffer handling process, which may be a part of the master process 32, allocates three pointers for each independent PDL data stream segment. A first pointer refers to the independent PDL data stream segment. A second pointer refers to the reply data portion generated by the sub-process, processing the independent PDL data stream segment. A third pointer refers to the intermediate data stream portion, generated from the independent PDL data stream segment. Each time a sub-process allocates an independent PDL data stream segment for processing, it gets these three pointers and processes the independent PDL data stream segment. Upon termination of the independent PDL data stream segment by the sub-process, a buffer handling process sends the pointer for the intermediate data stream portion to the combination process, whenever this pointer corresponds with the next pointer from the FIFO queue 34. The buffer handling process also sends the pointer for the reply data portion to the master process 32, whenever this pointer corresponds with the next pointer from the FIFO queue 34. Upon termination of the processing of this independent PDL data stream segment, the sub-process signals this fact to the buffer handling process which in turn signals the master process 32 and the combination process 39. Preferentially, the buffer handling process is a separate process, such that its load is kept away from the main data stream, which may form a bottle neck.

The combination process offers the resulting rearranged intermediate data stream 40 to a bitmap generation process 41 that generates a bitmap representation 42. The bitmap representation is sent to a marking engine 43 that writes the image represented by the bitmap representation on the hard copy, which can be paper, photographic film, a thermosensitive medium etc. Once a latent image is formed on a photographic film or medium, the medium must be chemically processed and developed by methods known in the art.

Having described in detail preferred embodiments of the current invention, it will now be apparent to those skilled in the art that numerous modifications can be made therein without departing from the scope of the invention as defined in the following claims.

I claim:

1. A method for reproducing an image described by a PDL data stream, comprising the following steps:

recognising in said PDL data stream data commands and control commands;

generating a plurality of independent PDL data stream segments;

assigning each data command to one of said segments;

assigning at least one control command to more than one of said segments;

translating each of said segments to intermediate data stream portions;

combining said portions to one intermediate data stream; and, reproducing said image from said intermediate data stream.

2. Method according to claim 1, further comprising the steps of:

deriving from said control commands a translation state;

generating for each said segment control commands descriptive for said translation state.

3. Method according to claim 1, wherein:

said segments are generated by one master process:

said segments are translated by one or more sub-processes;

each said sub-process selects segments for processing.

4. Method according to claim 3, wherein:

said master process derives a master translation state from said control commands in said PDL data stream;

each said sub-process derives a sub-process translation state from said control commands in said independent PDL data stream segments;

each said sub-process replies a change in said sub-process translation state to said master process, by a control command reply.

5. Method according to claim 4, wherein said master process:

computes a common translation state level from said control command replies;

generates for each segment control commands, descriptive for the difference between said master translation state and said common translation state level.

6. Method according to claim 4, wherein said master process:

analyses the contents of control commands;

rejects superfluous control commands from said segments.

7. Method according to claim 1, further comprising the steps of:

recognizing within said control commands reduced control commands and extended control commands;

assigning each extended control command to at most one said segment;

generating for at least one said segment a version control command, indicative of said extended control command.

8. Method according to claim 7, further comprising the steps of:

generating a sync control command in said segment containing the extended control command;

delaying the translation of subsequent segments until a sync control reply from said sync control command has been received.

9. Method according to claim 8, wherein said sync control reply is not received until all previous segments have been processed.

10. Method according to claim 7, further comprising the steps of:

generating a segment control command in each said segment;

recognizing among said extended control commands, commands for removal of an extended data structure;

suspending removal of said extended data structure until a reply has been received for said segment control command for at least all previous said segments making use of said extended data structure.

11. Method according to claim 10, further comprising the steps of:

recognizing among said extended control commands, commands for creation of an extended data structure;

suspending creation of said extended data structure until a previous removal of said extended data structure has been finished.

12. Method according to claim 11, further comprising the steps of:

recognizing among said data commands, commands making use of an extended data structure;

suspending usage of said extended data structure until said extended data structure is created.

13. An image reproduction system comprising:

means for recognising in a PDL data stream data commands and control commands;

means for generating a plurality of independent PDL data stream segments;

means for assigning each data command to one of said segments;

means for assigning at least one control command to more than one of said segments;

means for translating each of said segments to intermediate data stream portions;

means for combining said portions to one intermediate data stream;

means for reproducing an image from said intermediate data stream.

14. Raster image processor according to claim 13, comprising at least two processors, having each an independent memory means.

* * * * *